UNITED STATES PATENT OFFICE.

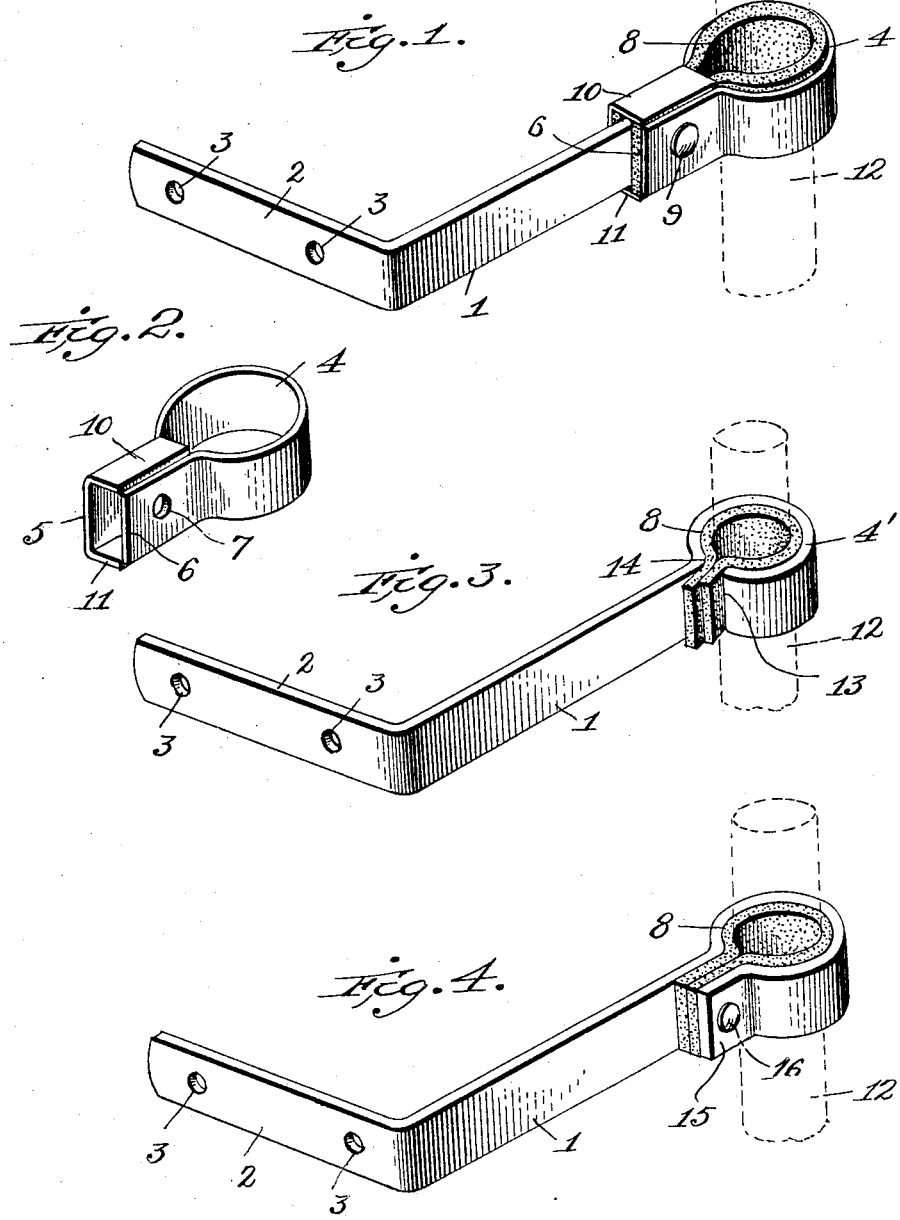

AUGUSTUS D. DIMICK, OF WAKEFIELD, MASSACHUSETTS.

DOWEL-GUIDE FOR PIANOS.

1,199,250.  Specification of Letters Patent.  Patented Sept. 26, 1916.

Application filed April 28, 1916. Serial No. 94,256.

*To all whom it may concern:*

Be it known that I, AUGUSTUS D. DIMICK, a citizen of the United States, residing at Wakefield, county of Middlesex, and State of Massachusetts, have invented certain new and useful Improvements in Dowel-Guides for Pianos; and I do hereby declare the following to be a full, clear, and exact description of the invention, such as will enable others skilled in the art to which it appertains to make and use the same.

The present invention has for its object to provide an improved guide for use in pianos to slidably hold and guide the dowels or rods which connect the pedal action with the expression mechanism. Guides of this type are commonly known as dowel guides and, as heretofore constructed, they usually comprise a bracket adapted to be secured to a suitable part of the piano casing, and an eye or ring-like portion through which the above-mentioned rod or dowel passes and in which the rod is slidably held. The eye or ring-like portion is usually lined with a bushing made of felt or other suitable material to insure quietness of operation as the rod slides in the guide.

The dowel guides heretofore employed have not proved entirely satisfactory, for in those guides in which the above-mentioned lining or bushing has not been positively held in place, the bushing is often lost by reason of the fact that it is easily displaced when the dowel is not in position. Attempts have been made to positively hold the bushing in place, but the results have not been satisfactory, as the retaining ring for the bushing had to be so constructed in order to hold the bushing in place that when the latter became worn, the dowel would contact with a part of the retaining ring or eye, thus defeating the purpose for which the bushing was originally intended.

According to the present invention, the bushing is positively held in place in a simple and reliable manner and yet there is no danger of contact between any part of the retaining ring or eye and the dowel.

The invention is illustrated in the accompanying drawing, in which:—

Figure 1 is a perspective view of one form of the improved dowel guide, a portion of the dowel being indicated by dotted lines; Fig. 2 is a detail perspective view showing the construction of the ring-like portion or eye through which the dowel passes; Fig. 3 is a perspective view of a modified form of dowel guide illustrating a different manner of holding the bushing in the eye; and Fig. 4 is a perspective view of a still further modified form of dowel guide illustrating another manner of forming the eye and of holding the bushing or lining therein.

Referring first to Figs. 1 and 2, it will be seen that the guide comprises a bracket portion 1 which may be constructed in any suitable manner, so that it may be secured to an appropriate part of the piano casing in order to bring the eye for the dowel into proper position with respect to the latter. In the present instance, the end portion 2 of the bracket is bent substantially at right angles to the main body portion, so that the bracket may be secured to the side wall of the piano casing, and when so positioned, the eye or ring-like portion of the guide will assume its proper position. The bent end portion 2 of the bracket is provided with openings 3 by means of which the bracket may be secured to the piano casing.

In the form of the invention illustrated in Figs. 1 and 2, the eye or ring-like portion through which the dowel passes is formed separately and independently of the bracket 1, and it is then riveted thereto. The eye or ring-like portion which constitutes the guide proper for the dowel is illustrated in Fig. 2, from which it will be noted that it comprises a strip 4 of suitable material, such as metal, which is bent to a circular shape and the extremities 5 and 6 brought adjacent each other in position to receive between them the extremity of the bracket 1. The extremities 5 and 6 of the strip 4 are perforated as indicated at 7, in order to enable the eye to be riveted or otherwise secured to the bracket.

Before the eye is secured to the bracket, a lining 8 of felt, or other suitable material, is positioned in the eye, as indicated in Fig. 1. This lining is in the form of a strip which is applied to the inner surface of the eye, the ends of the strip being extended rearwardly between the parallel end portions 5 and 6 of the eye. When the eye is positioned on the bracket, the extremity of the bracket is inserted between the end portions of the lining 8, as indicated in Fig. 1, so that one end of the lining strip will be positioned between the end of the bracket and the extremity 6 of the eye, while the other end of the lining strip will be positioned between the end of the bracket and the other extremity 5 of the eye. When the eye is secured to the bracket by means of the rivet or other fastening device, indicated at 9, it is obvious that the ends of the lining strip will be clamped to the end of the bracket by means of the end portions of the bent strip which constitutes the eye. If desired, one end portion of the eye, for instance, that shown at 5, may be provided with integrally-formed flaps 10 and 11 which may be bent inwardly to form a substantially closed socket for receiving the extremity of the bracket 1 and the end portions of the lining strip 8. These bent-over portions 10 and 11 are not absolutely necessary and may be omitted, if desired. The eye or ring-like portion so lined serves to receive the dowel, a portion of which is indicated in dotted lines at 12.

In the modification illustrated in Fig. 3, the eye or ring-like portion is formed as an integral part of the bracket. This is accomplished by bending the end of the bracket strip to substantially circular shape, as indicated at 4'. The lining strip 8, in this instance, is positioned before the end portion of the bracket is bent to its final shape, or, in other words, before such end portion of the bracket is bent a sufficient distance to bring the eye opening to its minimum size. The extremities of the lining strip 8 project from the eye through the opening between the extremity 13 of the eye and the shoulder 14 formed in the process of making the eye. When the eye is reduced to its final minimum diameter, it is obvious that the extremities of the lining strip will then be tightly clamped between the end 13 of the eye and the said shoulder 14, or other portion of the bracket adjacent which the end 13 happens to come.

In the modification of Fig. 4, the eye is also formed as an integral part of the bracket 1, but the end portion 15 of the eye is riveted or otherwise positively secured to the adjacent portion of the bracket by means of the rivet or other fastening device 16. The extremities of the lining 8 in this form of the device are positioned between the extremity 15 of the eye and the adjacent portion of the bracket 1, as clearly shown in the drawing, so that they will be positively clamped and held by means of the rivet 16.

It will now be noted that in all three forms of the device, the lining for the eye or guide proper is positively held in position and cannot be accidentally displaced. In each instance, the lining is in the form of a strip, the extremities of which are positively clamped by adjacent portions of the guide, the guide in such case being considered the entire device, regardless of whether the eye be formed as a separate piece and secured to the bracket, or whether it be formed as an integral part of the bracket.

The lining strip or bushing may be reduced to a very thin state by wear without danger of contact between the dowel and the metallic part of the eye. This is due to the improved manner in which the lining is held in place, as the lining is tightly gripped without sacrificing its ability to prevent noise, and scraping between the dowel and the guide throughout the life of the lining. Even when the dowels are not in position, the linings or bushings cannot be displaced, as they are positively clamped to the guide. This clamping action is accomplished by simple and reliable means, and in such a manner that it in no way reduces the effectiveness of the lining or bushing.

What I claim is—

1. A dowel guide for pianos comprising a bracket having a dowel-receiving eye and a strip of lining material covering the inner surface of the eye, said bracket including means for positively clamping the extremities of the lining strip thereto.

2. A dowel guide for pianos comprising a bracket having a dowel-receiving eye and a strip of lining material covering the inner surface of the eye and having its extremities positively clamped between adjacent portions of the guide at the juncture of the eye with the bracket.

3. A dowel guide for pianos comprising a bracket, a dowel-receiving eye having end portions secured to the bracket and a strip of lining material covering the inner surface of the eye and having its extremities clamped between the bracket and said end portions of the eye.

4. A dowel guide for pianos comprising a bracket, a dowel-receiving eye having end portions secured to opposite sides of the bracket, and a strip of lining material covering the inner surface of the eye and having one of its extremities clamped between the bracket and one end portion of the eye and its other extremity clamped between the bracket and the other end portion of the eye.

In testimony whereof I affix my signature.

AUGUSTUS D. DIMICK.